United States Patent [19]

Sato et al.

[11] Patent Number: 5,511,161
[45] Date of Patent: Apr. 23, 1996

[54] METHOD AND APPARATUS TO RESET A MICROCOMPUTER BY RESETTING THE POWER SUPPLY

[75] Inventors: Kaoru Sato, Yokohama; Toshiyuki Itoh, Sagamihara; Kazuhiko Okazawa, Kawasaki; Junichi Kimizuka, Yokohama; Akihisa Kusano, Kawasaki; Makoto Abe, Kashiwa; Toshihiko Inuyama, Fujisawa, all of Japan

[73] Assignee: Canon Kabushiki Kaisha, Tokyo, Japan

[21] Appl. No.: 158,373

[22] Filed: Nov. 29, 1993

Related U.S. Application Data

[63] Continuation of Ser. No. 536,285, Jun. 7, 1990, abandoned.

[30] Foreign Application Priority Data

Jun. 8, 1989 [JP] Japan ................................. 1-145666

[51] Int. Cl.$^6$ .............................. G06F 1/24; G06F 1/28
[52] U.S. Cl. ..................... 395/182.21; 395/182.08; 395/182.12; 364/DIG. 2; 364/944.61; 364/945
[58] Field of Search ................................. 395/575, 700, 395/181, 182.08, 182.12, 182.2, 182.21, 183.2, 750; 371/12, 14, 16.3, 18, 21.4, 28

[56] References Cited

U.S. PATENT DOCUMENTS

| | | | |
|---|---|---|---|
| 4,204,249 | 5/1980 | Dye et al. | 395/750 |
| 4,318,625 | 3/1982 | Survant | 400/322 |
| 4,433,390 | 2/1984 | Carp et al. | 395/750 |
| 4,439,805 | 3/1984 | Tarleton | 361/92 |
| 4,464,584 | 8/1984 | Hentzschel et al. | 395/750 |
| 4,489,394 | 12/1984 | Borg | 395/750 |
| 4,551,841 | 11/1985 | Fujita et al. | 395/750 |
| 4,553,204 | 11/1985 | Hashimoto | 395/750 |
| 4,586,179 | 4/1986 | Sirazi et al. | 371/16.3 |
| 4,593,349 | 6/1986 | Chase et al. | 364/200 |
| 4,654,821 | 3/1987 | Lapp | 395/750 |
| 4,663,539 | 5/1987 | Sharp et al. | 395/750 |
| 4,677,566 | 6/1987 | Whittaker et al. | 395/750 |
| 4,701,856 | 10/1987 | DiGiulio et al. | 364/464.02 |
| 4,782,355 | 11/1988 | Sakai et al. | 395/750 |
| 4,866,713 | 9/1989 | Worger et al. | 371/16.3 |
| 5,019,996 | 5/1991 | Lee | 395/750 |
| 5,203,000 | 4/1993 | Folkes et al. | 395/750 |

FOREIGN PATENT DOCUMENTS

WOA8805569 7/1988 WIPO.

*Primary Examiner*—Thomas G. Black
*Assistant Examiner*—John C. Loomis
*Attorney, Agent, or Firm*—Fitzpatrick, Cella, Harper & Scinto

[57] ABSTRACT

The invention provides an interunit communication system which comprises a main unit and a plurality of subunits and executes a communication between the units by a microcomputer of each unit. The system comprises: power producing means, provided for each subunit, for producing a driving power for the microcomputer of the subunit by a power which is supplied from the main unit through a power line; resetting means, provided for each subunit, for resetting the microcomputer of the subunit in the case where the power supply was restarted after the power supply from the main unit had been shut off; detecting means, provided for the main unit, for detecting a runaway of the microcomputer of the subunit on the basis of a reception state from a signal line for communication; power shut-off means, provided for the main unit, for shutting off the power supply to the subunit when the detecting means detects the runaway of the microcomputer; and power restarting means for restarting the power supply to the subunit.

21 Claims, 5 Drawing Sheets

METHOD AND APPARATUS TO RESET A MICROCOMPUTER BY RESETTING THE POWER SUPPLY

This application is a continuation of application Ser. No. 07/536,285 filed Jun. 7, 1990 now abandoned.

BACKGROUND OF THE INVENTION

1. Field of the Invention

The present invention relates to an interunit communication system for executing a communication between a main unit and one or a plurality of subunits which are controlled by the main unit and also relates to a method of resetting the subunits by the main unit.

2. Related Background Art

Hitherto, in such a kind of system for executing the interunit communication, power source lines, communication lines, resetting lines, and other signal lines are individually provided and a plurality of lines are combined and the units are connected. On the other hand, there also exists a system in which in order to omit the resetting lines among the above lines, each subunit has therein a circuit to individually reset an included microcomputer.

However, in the system in which in order to reset the microcomputer in the subunit, a plurality of lines including the resetting line are combined to connect the units, in addition to a drawback that the combining cost is necessary, there is a large drawback such that in the case where noises were mixed onto the resetting line, the microcomputer in the subunit is reset by the noises.

On the other hand, in the system in which the resetting line is omitted by providing the resetting circuit in the subunit, if the microcomputer in the subunit runs away, there is no means for detecting such a microcomputer runaway and for automatically resetting the microcomputer. Therefore, each device in the subunit that runs away, results in serious damage to the apparatus. To stop the runaway, a runaway detecting circuit must be provided for each subunit. There is a drawback that when the number of subunits increases, the cost of the runaway detecting circuits substantially increase.

SUMMARY OF THE INVENTION

It is an object of the invention to eliminate the abovementioned drawbacks.

It is another object of the invention to provide a resetting method in which one unit can reset other units without providing any resetting line among the units.

It is still another object of the invention to provide an interunit communication system in which resetting lines among units can be omitted and in the case where a microcomputer runs away, the microcomputer can be certainly reset without providing any runaway detecting means for each subunit.

To accomplish the above objects, an interunit communication system according to the invention comprises: a main unit which has power source means or is connected to the power source means; and one or a plurality of subunits which is/are connected to the main unit through one or a plurality of power lines and one or a plurality of communication lines, wherein the subunit receives a power source through the power line from the main unit and the main unit resets the subunit by controlling a voltage to be applied to the power line.

On the other hand, according to a preferred embodiment of the invention, means for resetting a microcomputer is provided for each subunit and a main unit resets the subunit by shutting off the power supply to the subunit, so that there is no need to use any resetting line between the main unit and each subunit. Therefore, the main unit and each subunit can be connected by only a power source line to drive devices of the subunit and a signal line for communication.

The runaway of the microcomputer in the subunit is detected by the detecting means of the main unit and the power supply to the subunit is shut off, so that the resetting means in the subunit resets the microcomputer. Therefore, the runaway of the microcomputer in the subunit can be prevented without providing any runaway detecting means for each subunit, and a cheap construction can be realized.

The above and other objects and features of the present invention wil become apparent from the following detailed description and the appended claims with reference to the accompanying drawings.

DETAILED DESCRIPTION OF PREFERRED EMBODIMENTS

An embodiment regarding the present invention will be described in detail hereinbelow with reference to the drawings.

Figure 1:
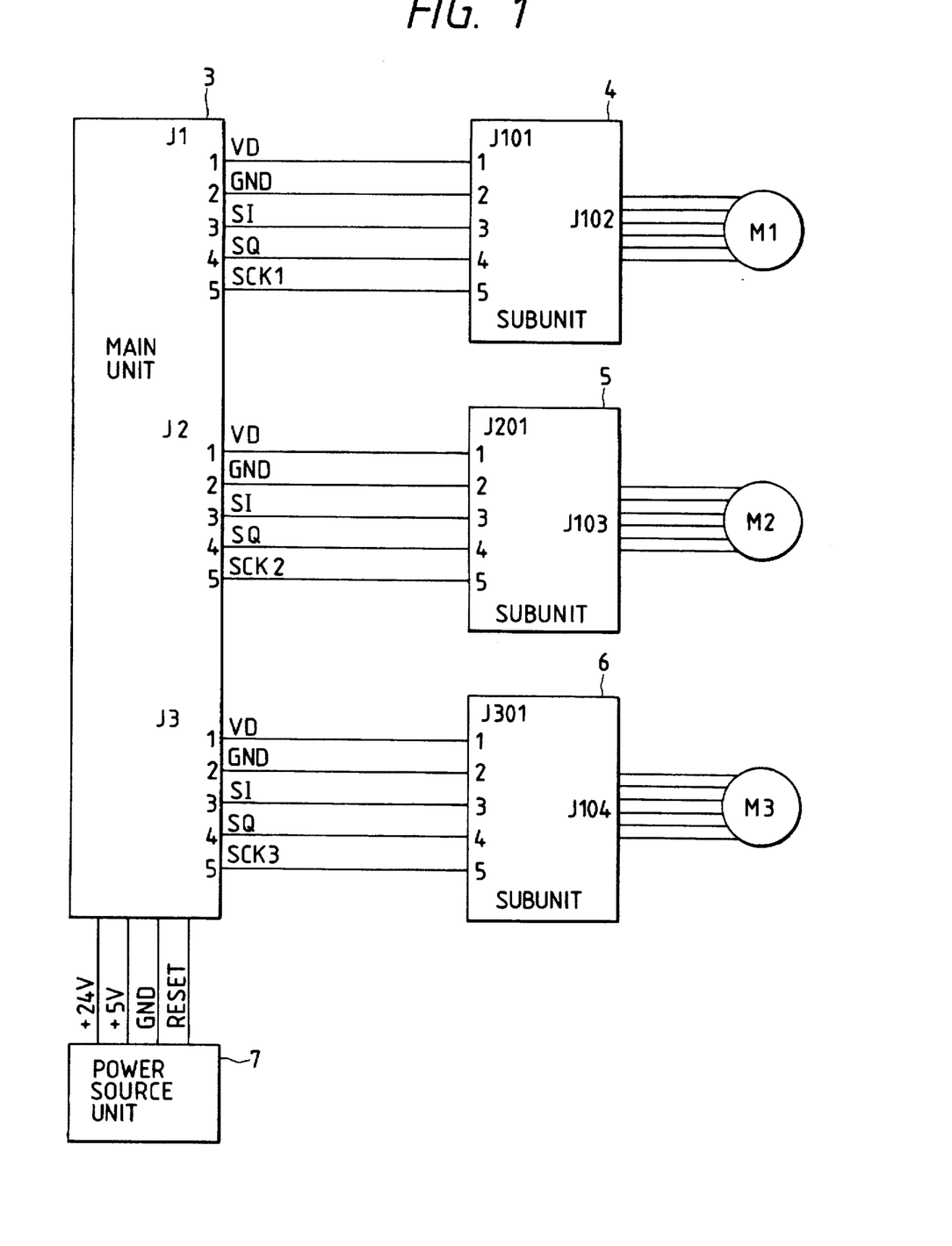
FIG. 1 is a circuit diagram showing the connection of a main unit and subunits according to an embodiment of the invention.

FIG. 1 is a circuit diagram showing the connection of a main unit and subunits according to an embodiment of the invention.

In the embodiment, three subunits 4 to 6 are connected to a main unit 3. A power source unit 7 is also connected to the main unit 3. A power source of +5V, a power source of +24V, and a resetting signal are supplied from the power source unit 7 to the main unit 3.

Figure 2:
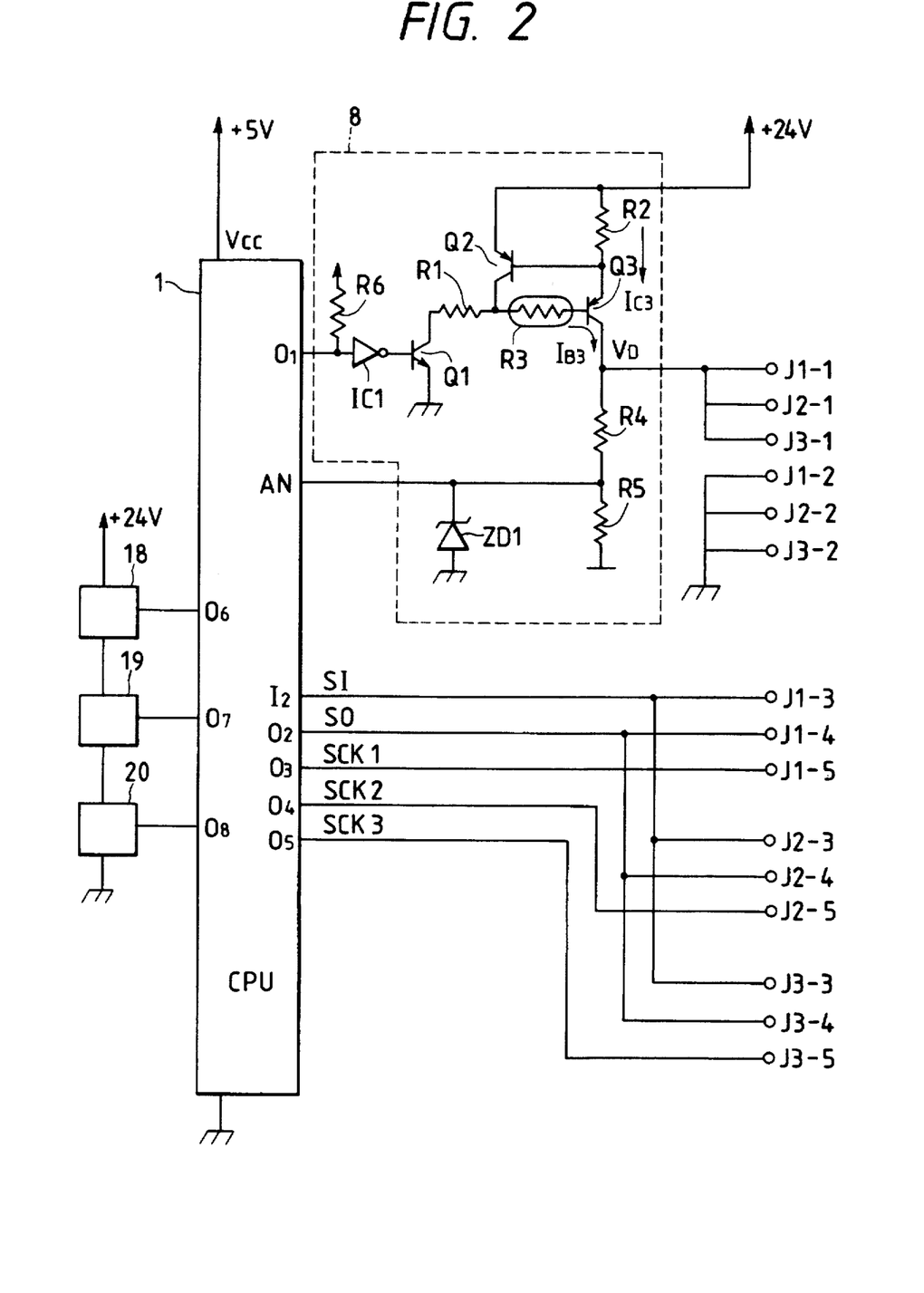
FIG. 2 is a circuit diagram showing an arrangement of the main unit in the embodiment.

FIG. 2 is a circuit diagram showing an arrangement of the main unit 3.

The main unit 3 has: a one-chip microcomputer (hereinafter, referred to as a CPU) 1 having therein an ROM and an RAM; and a power source circuit 8 to supply power sources to the subunits 4 to 6. The power source circuit 8 has: transistors $Q_1$ to $Q_3$; resistors $R_1$ to $R_6$; a Zener diode $ZD_1$; and an inverter $IC_1$. Particularly, the resistor $R_3$ is a posistor whose resistance value increases with an increase in temperature of the device. In addition, other loads 18, 19, and 20 of 24V are connected to the CPU 1.

Figure 3:
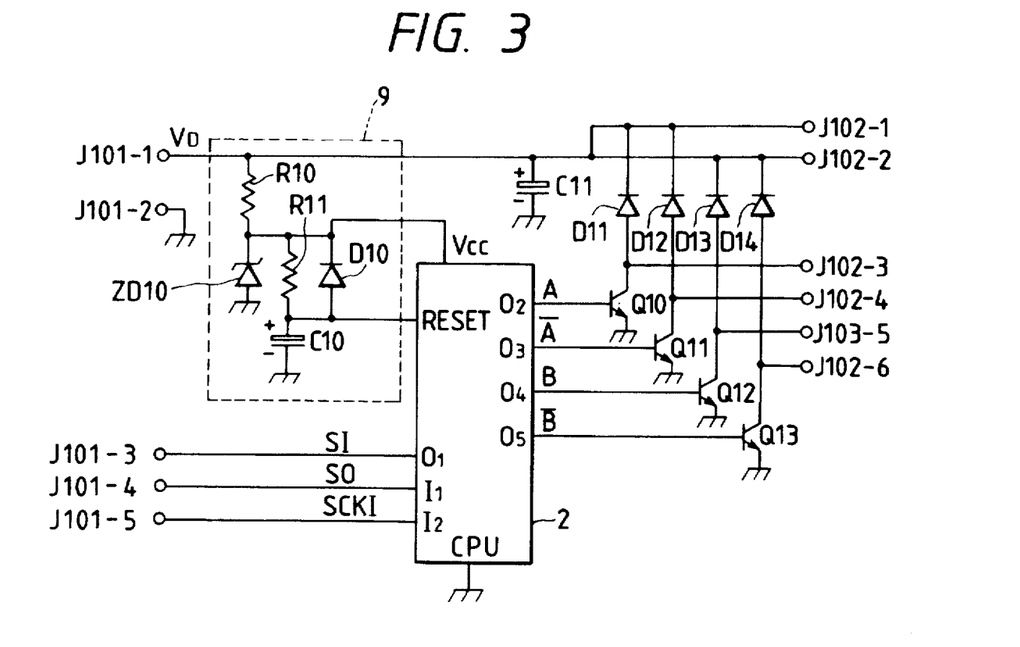
FIG. 3 is a circuit diagram showing an arrangement of the subunit in the embodiment.

FIG. 3 is a circuit diagram showing an arrangement of the subunits 4 to 6. Although three subunits exist, since they have the same construction, only the first unit 4 is shown in FIG. 3.

Each of the subunits 4 to 6 has: a CPU 2 having therein an ROM and an RAM; and a resetting and subpower source circuit 9. The resetting and subpower source circuit 9 has: resistors $R_{10}$ and $R_{11}$; a diode $D_{10}$; a Zener diode $ZD_{10}$; and a capacitor $C_{10}$. On the other hand, transistors $Q_{10}$ to $Q_{13}$ and diodes $D_{11}$ to $D_{14}$ are connected to the CPU 2.

In the above construction, the CPU 1 in the main unit 3 is made operative by the power source of +5V which is supplied from the power source unit 7 and a resetting signal RESET. A power source of +24V is also supplied.

When the CPU 1 is reset, the input/output port is set to a high impedance. An output of the inverter IC1 is set to the low level. The transistors $Q_1$ and $Q_3$ are turned off. No power source is supplied from power source output terminals $J_{1-1}$, $J_{2-1}$, and $J_{3-1}$ to the subunits.

A voltage which is obtained by dividing a power source voltage $V_D$ to the subunits 4 to 6 by the resistors $R_4$ and $R_5$ is input to an analog-digital conversion port AN (hereinafter, referred to as an A/D port AN) of the CPU 1 and is monitored. After the CPU 1 confirmed that the power sources to the subunits 4 to 6 had completely been shut off on the basis of an input of the A/D port AN, an output port $O_1$ is set to the low level to thereby turn on the transistors $Q_1$ and $Q_3$ and the power sources are supplied to the subunits 4 to 6.

Figure 4:
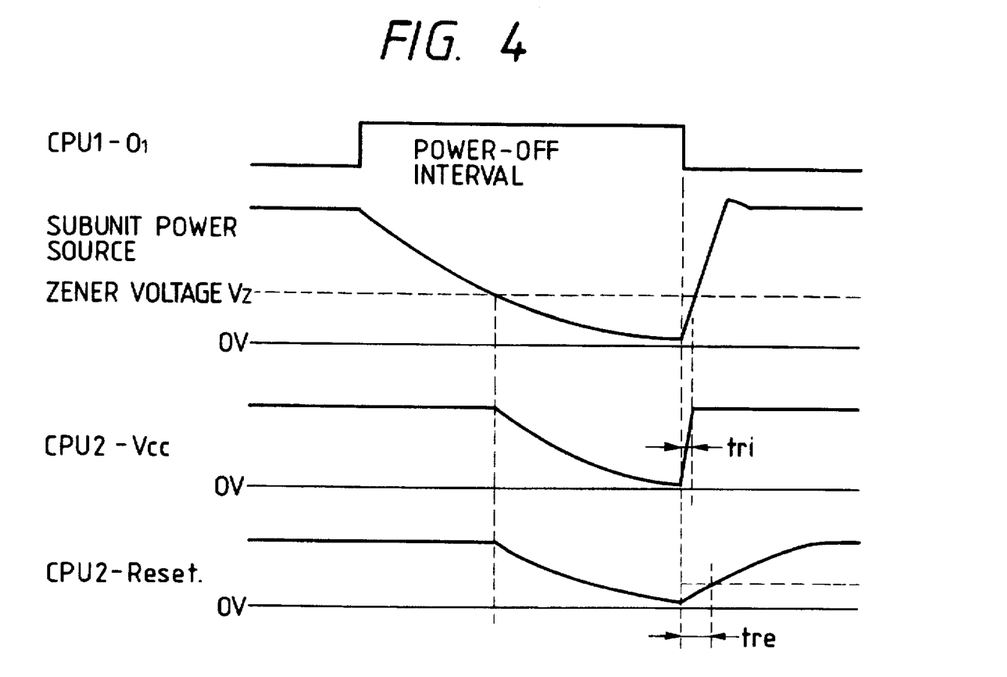
FIG. 4 is a timing chart showing a resetting sequence of a subCPU in the embodiment.

When the power source is supplied to an input terminal $J_{101-1}$ of the subunit 4, a power source $V_{cc}$ of the CPU 2 of the subunit is formed by the resistor $R_{10}$ and Zener diode $ZD_{10}$. At this time, as shown in FIG. 4, although the power source $V_{cc}$ of the CPU 2 rises at time $t_{ri}$, the rising timing of the resetting input RESET of the CPU 2 is delayed by the resistor $R_{11}$ and a time constant of the capacitor $C_{10}$. The CPU 2 is reset for the time interval of $t_{re}$ when the voltage level is a predetermined voltage level or less.

It is now assumed that when the CPUs 1 and 2 are controlling the system by starting the operations, the CPU 2 erroneously operated and ran away due to, for instance, electrostatic noises or the like. In this case, the CPUs 1 and 2 periodically transmit and receive information by a three-line type serial communication which is connected by a serial input SI, a serial output SO, and serial clocks $SCK_1$. However, when the CPU 2 runs away, the communication is interrupted. Therefore, the CPU 1 can detect that the CPU 2 has run away.

FIG. 4 is a timing chart showing a sequence to reset the CPU 2 in the above case.

First, the output port $O_1$ of the CPU 1 is set to the high level and the transistors $Q_1$ to $Q_3$ are turned off, thereby shutting off the power sources to the subunits 4 to 6. Since the subunits 4 to 6 have not only resistive loads but also capacitive loads and the like, the power source voltage is not soon set to 0V but gradually approaches to 0V with a certain time constant. When the power source voltage decreases to a level lower than a Zener voltage $V_z$ of the Zener diode $ZD_{10}$, the power source $V_{cc}$ of the CPU 2 also gradually drops. As mentioned above, in the main unit 3, the subunit power source is also input to the CPU 1 by the resistors $R_4$ and $R_5$ and monitored. As in the resetting process upon activation of the system mentioned above, when the CPU 1 confirms that the subunit power source dropped until a voltage enough to reset the CPU 2, the CPU 1 sets the output port $O_1$ to the low level and turns on the transistors $Q_1$ and $Q_3$ and can reset the CPU 2.

As shown in FIG. 1, stepping motors $M_1$, $M_2$, and $M_3$ are connected to the subunits 4 to 6. When the CPU 1 intends to drive the stepping motor $M_2$, the CPU 1 first outputs a stepping motor drive command to the CPU 2 by using the communication line. The CPU 2 receives the command and executes a stepping motor exciting signal output program written in the ROM provided in the CPU 2. Then, the CPU 2 outputs exciting signals of the double-phase exciting type from output ports $0_2$ to $0_5$ of the CPU 2 and can drive the stepping motor $M_2$ by the transistors $Q_{10}$, $Q_{11}$, $Q_{12}$, and $Q_{13}$. The diodes $D_{11}$, $D_{12}$, $D_{13}$, and $D_{14}$ are used to absorb the counter electromotive voltage of the stepping motor $M_2$ The resistor $R_2$ in FIG. 2 functions in a manner such that when a collector current $IC_3$ of the transistor $Q_3$ exceeded a predetermined current, the transistor $Q_2$ is turned on and the collector current $IC_3$ is limited. On the other hand, the posistor $R_3$ functions in a manner such that in the case where, for instance, a coil of the stepping motor $M_2$ in the subunit 5 was short-circuited or the like, large currents flowing through the transistor $Q_3$ and the stepping motor driving transistors $Q_{10}$ to $Q_{13}$ in the subunits are suppressed. There is also a possibility such that when a large current flows due to a short-circuit of a load or the like, a temperature suddenly increases and the transistor $Q_3$ is burned and damaged. However, by arranging the posistor $R_3$ in contact with the transistor $Q_3$, a resistance value of the posistor $R_3$ rises in accordance with an increase in temperature of the transistor $Q_3$ and a base current $I_{B3}$ of the transistor $Q_3$ is limited and the collector current $I_{C3}$ can be reduced. Thus, it is possible to prevent burning or damaging the transistor $Q_3$ and the transistors $Q_{10}$ to $Q_{13}$ in the subunits.

Since the CPU 1 monitors the power source voltage supplied to the subunit by the resistors $R_4$ and $R_5$ by the A/D port AN, if the transistor $Q_3$ failed and the power source voltage dropped due to some causes, such a voltage drop is detected and the fact that the power source could not be supplied to the subunit can be displayed. If the relation between the Zener voltage $V_z$ of the Zener diode $ZD_1$ to protect an overvoltage input of the A/D port AN of the CPU 1 and the input voltage $V_{Di}$ of the A/D port AN of the CPU 1 when the power source voltage $V_D$ to the subunit is correct is set to $V_z > V_{Di}$ and the potential difference of $(V_z - V_{Di})$ can be sufficiently detected at the A/D port AN of the CPU 1, when an overvoltage exceeding the normal input voltage $V_{Di}$ was generated and the input voltage $V_{Di}$ increased, such a voltage increase can be detected and the transistor $Q_3$ can be immediately turned off. Further, since the transistor $Q_3$ exists between the power source line to the subunit and the 24V line, the other 24V loads and the power source unit can be protected from the overvoltage.

Figure 5:
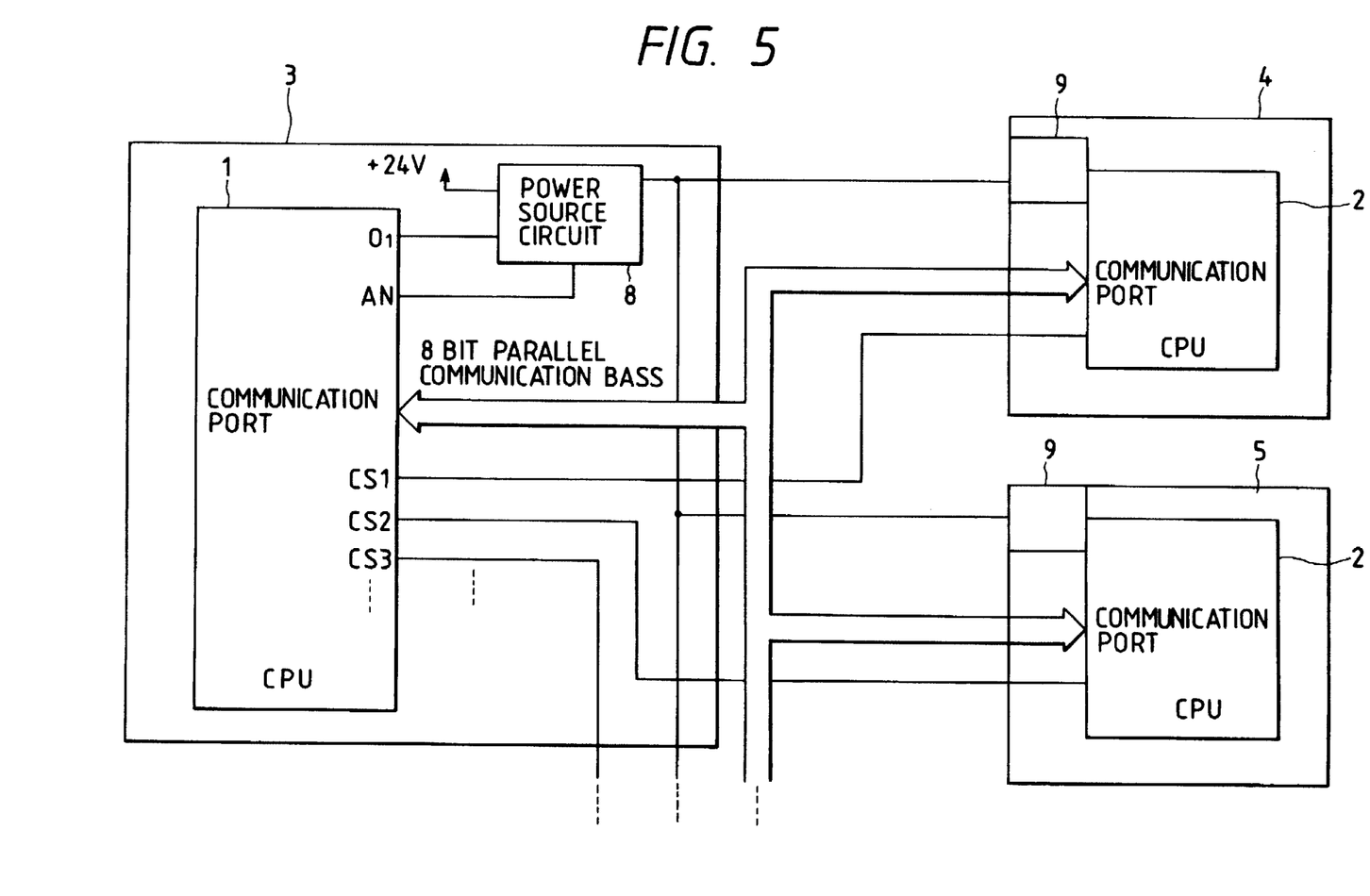
FIG. 5 is a circuit diagram showing the second embodiment of the invention.

FIG. 5 is a block diagram showing the second embodiment of the invention.

In the first embodiment, the 3-line type serial communication method has been used for the communication between the CPUs. However, the similar operation can be also obtained by using the parallel communication method using 8-bit communication buses. At this time, $CS_1$, $CS_2$, and $CS_3$ of the CPU 1 denote chip selection signals to select the CPU to be communicated.

Figure 6:
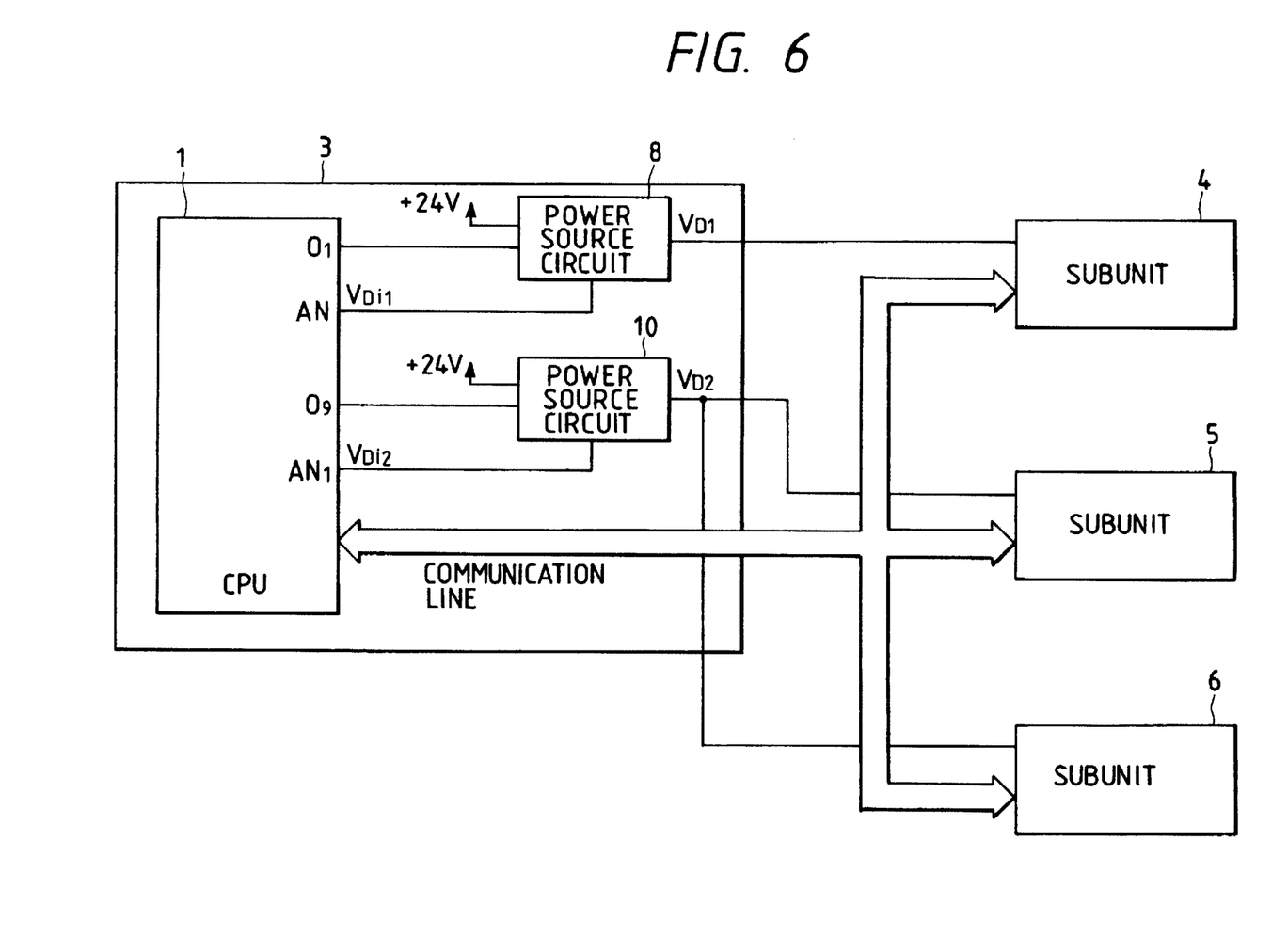
FIG. 6 is a circuit diatram showing the third embodiment of the invention.

On the other hand, FIG. 6 is a block diagram showing the third embodiment of the invention.

In the embodiment, a communication line is commonly used for each unit, while power source lines to the subunits are classified into two systems and the power sources to the subunits are controlled by the power source circuits 8 and 10, respectively.

The CPU 1 can interrupt the power supply to the subunit 4 by changing an output level of the output port $O_1$ to the power source circuit 8. On the other hand, the CPU 1 can interrupt the power supply to the subunits 5 and 6 by changing an level of an output port O₉ to the power source circuit 10.

On the other hand, as shown in the first embodiment, the power source voltages are monitored by the A/D ports AN and AN₁ of the CPU 1, respectively. When the subunit ran away, in the case where the subunit which exerts an influence on the whole system exists and the case where only the relevant unit is influenced, by controlling the power supply by using two systems or by individually supplying a power source every unit as in the embodiment, the influence on the system can be minimized.

On the other hand, if a reset command is included in the commands which are transmitted from the main CPU to the subCPU and at the leading time of the power-on of the system or the like, a soft resetting is executed from the main CPU to the subCPU in addition to the hard resetting, the subCPU can be further certainly reset.

The present invention is not limited to the foregoing embodiments but many modifications and variations are possible within the spirit and scope of the appended claims of the invention.

What is claimed is:

1. A method of resetting a subunit comprising the steps of:

shutting off power supplied to the subunit;

discriminating whether a voltage of a power line to the subunit drops to a predetermined level by shutting off the power supplied to the subunit in said shutting off step; and restarting the power supply to the subunit after it is discriminated that the Voltage drops to the predetermined level in said discriminating step so as not to restart the power supply before the voltage reaches the predetermined level.

2. A method system according to claim 1, wherein the subunit includes a microcomputer, and further comprising the step of providing to the microcomputer a resetting signal for resetting the microcomputer for a predetermined period after the power supply was restarted on the basis of the voltage of the power line, thereby resetting the subunit.

3. A method according to claim 1, wherein said method is performed when an abnormal state of the at least one subunit is detected 4. A method according to claim 3, further comprising the step of detecting the abnormal state of the subunit through a communication with the subunit.

5. A method according to claim 1, further comprising the step of detecting a voltage level of the power supplied to the subunit.

6. An interunit communicating system comprising:

a main unit; and at least one subunit, each subunit being connected to the main unit through a power line, wherein said main unit comprises control means for controlling a power supply to each subunit via said power line, and monitoring means for monitoring a voltage of the power line, and wherein when said main units resets the at least one subunit, the control means shuts off the power supplied to the at least one subunit and restarts the power supply to said at least one subunit after said monitoring means acknowledges that a voltage of the power line drops to a predetermined level by shutting off the power supply so as not to restart the power supply before the voltage of the power line drops to the predetermined level after the power supplied to the at least one subunit is shut off.

7. A system according to claim 6, wherein said subunit includes a microcomputer, and means for generating a resetting signal applied to a reset terminal of the microcomputer on the basis of the voltage of the power line, said resetting signal occurring during a predetermined period after restarting the power supply to the subunit, thereby resetting the at least one subunit.

8. A system according to claim 6, wherein said said main unit includes means for detecting a supply of an overcurrent to the subunit and/or for detecting an increase in temperature of a circuit due to the supply of the overcurrent to the at least one subunit and means for limiting a current to the at least one subunit on the basis of at least either one of the detecting of the supply of the overcurrent to the subunit and the increase in temperature of a circuit device due to the supply of the overcurrent.

9. A system according to claim 6, wherein said monitoring means includes a CPU includes having an A/D converter, and a signal corresponding to the voltage of the power supplied to said at least one subunit is input to an analog input terminal of the CPU.

10. A system according to claim 6, wherein said main unit detects an abnormal state of said at least one subunit on the basis of a communication condition between the main unit and the at least one subunit.

11. A system according to claim 6, further comprising means for detecting the abnormal state of the at least one subunit, wherein when the abnormal state of the at least one subunit is detected by said detecting means, the at least one subunit is reset.

12. A system according to claim 11, wherein said detecting means detects the abnormal state of the at least one subunit on the basis of a communication between the main unit and the at least one subunit.

13. A system according to claim 11, wherein said main unit reset the subunit in which the abnormal state is detected or a group of the subunits including the subunit in which the abnormal state in detected.

14. A main unit connected with at least one subunit through a power line, comprising:

control means for supplying a power supply to each subunit via said power line; and monitoring means for monitoring a voltage of the power line, wherein when said main unit resets the at least one subunit, said control means shuts off the power supplied to the at least one subunit and restarts the power supply to said at least one subunit after said monitoring means acknowledges that a voltage of the power line drops to a predetermined level by shutting off the power supply, so as not to restart the power supply before the voltage of the power line, drops to the predetermined level after the power supplied to the at least one subunit is shut off.

15. A main unit according to claim 14, wherein each subunit includes a microcomputer, and means for generating a resetting signal applied to a reset terminal of the microcomputer, said resetting signal predetermined period after restarting the power to the at least one subunit, thereby resetting the at least one subunit.

16. A main unit according to claim 14 further comprising means for detecting a supply of an overcurrent to the subunit and/or for detecting an increase in temperature of a circuit due to the supply of the overcurrent to the at least one subunit and means for limiting a current to the at least one subunit on the basis of at least either one of the detecting of the supply of the overcurrent to the at least one subunit and the increase in temperature of a circuit device due to the supply of the overcurrent.

17. A unit according to claim 14, wherein said monitoring means includes a CPU including an A/D converter, and a signal corresponding to the voltage of the power source supplied to said at least one subunit is input to an analog input terminal of the CPU.

18. A unit according to claim 14, wherein said main unit detects an abnormal state of said at least one subunit on the basis of a communication condition between the main unit and the at least one subunit.

19. A unit according to claim 14, further comprising means for detecting an abnormal state of the at least one subunit, wherein when the abnormal state of the at least one subunit is detected by said detecting means, the at least one subunit is reset.

20. A unit according to claim 19, wherein said detecting means detects the abnormal state of the at least one subunit on the basis of a communication between the main unit and the at least one subunit.

21. A unit according to claim 19, wherein said main unit resets the subunit in which the abnormal state is detected or a group of the subunits including the subunit in which the abnormal state is detected.

* * * * *

UNITED STATES PATENT AND TRADEMARK OFFICE
CERTIFICATE OF CORRECTION

PATENT NO. : 5,511,161

DATED : April 23, 1996

INVENTORS : KAORU SATO ET AL.

It is certified that error appears in the above-identified patent and that said Letters Patent is hereby corrected as shown below:

COLUMN 1

Line 29,   "such" should be deleted.

COLUMN 2

Line 17,   "wil" should read --will--;
   Line 35,   "diatram" should read --diagram--.

COLUMN 3

Line 11,   "inverter IC1" should read --inverter $IC_1$--.

COLUMN 4

Line 5,   "ports $O_2$ to $O_5$of" should read --ports $O_2$ to $O_5$ of--;
   Line 8,   "motor $M_2$" should read --motor $M_2$.--;

UNITED STATES PATENT AND TRADEMARK OFFICE
CERTIFICATE OF CORRECTION

PATENT NO. : 5,511,161

DATED : April 23, 1996

INVENTORS: KAORU SATO ET AL.

It is certified that error appears in the above-identified patent and that said Letters Patent is hereby corrected as shown below:

COLUMN 4

Line 10, "current $IC_3$" should read --current $I_{C3}$--;
Line 12, "current $IC_3$" should read --current $I_{C3}$-- and "On" should read --On--;
Line 27, "transistors $Q_{10}$ to $Q_{13}$." should read --transistors $Q_{10}$ to $Q_{13}$--.

COLUMN 5

Line 2, "an level" should read --a level--;
Line 27, "shutting off" should read --shutting-off--;
Line 31, "Voltage" should read --voltage--;
Line 35, "system" should be deleted;
Line 42, "at least one" should be deleted;
Line 59, "units" should read --unit--.

UNITED STATES PATENT AND TRADEMARK OFFICE
CERTIFICATE OF CORRECTION

PATENT NO. : 5,511,161

DATED : April 23, 1996

INVENTORS : KAORU SATO ET AL.

It is certified that error appears in the above-identified patent and that said Letters Patent is hereby corrected as shown below:

COLUMN 6

Line 8, "said said" should read --said--;
Line 18, "includes" (second occurrence) should be deleted.
Line 42, "in" (second occurrence) should read --is--;
Line 58, "line," should read --line--;
Line 64, "signal" should read --signal occurring during a--.

COLUMN 7

Line 10, "unit" should read --main unit--;
Line 16, "A unit" should read --A main unit--.

UNITED STATES PATENT AND TRADEMARK OFFICE
CERTIFICATE OF CORRECTION

PATENT NO. : 5,511,161

DATED : April 23, 1996

INVENTORS : KAORU SATO ET AL.

It is certified that error appears in the above-identified patent and that said Letters Patent is hereby corrected as shown below:

<u>COLUMN 8</u>

Line 1, "unit" should read --main unit--;
Line 7, "unit" should read --main unit--;
Line 14, "A unit" should read --A main unit--.

Signed and Sealed this

Tenth Day of December, 1996

Attest:

BRUCE LEHMAN

*Attesting Officer*  Commissioner of Patents and Trademarks